Sept. 7, 1926.  H. J. RANGER  1,599,246
WEATHER SHIELD FOR MOTOR CARS
Filed Oct. 10, 1922
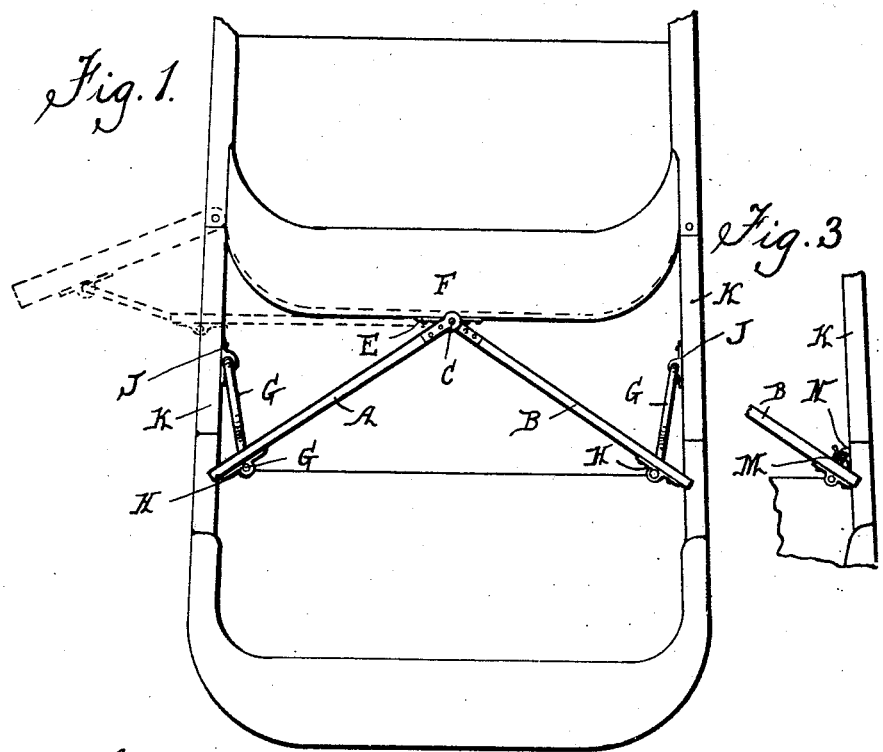
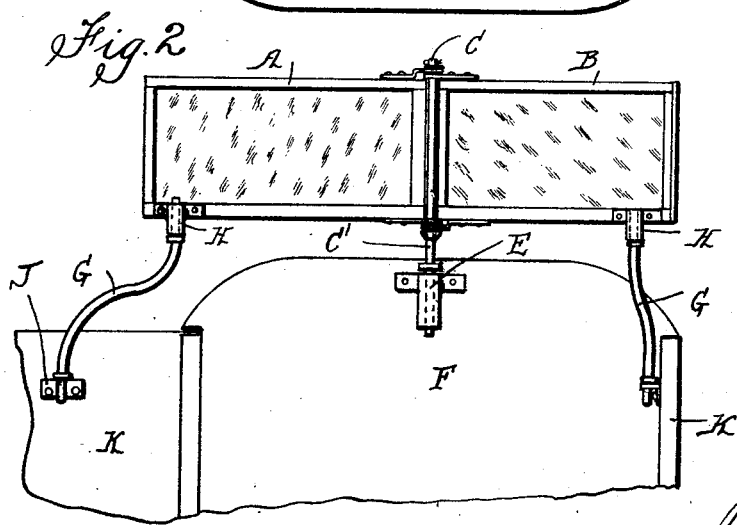
Inventor:
Henry James Ranger Patented Sept. 7, 1926.

1,599,246

UNITED STATES PATENT OFFICE.

HENRY JAMES RANGER, OF CHRISTCHURCH, NEW ZEALAND.

WEATHER SHIELD FOR MOTOR CARS.

Application filed October 10, 1922, Serial No. 593,542, and in New Zealand June 24, 1922.

My invention relates to the weather shields of motor cars and more particularly to the shields used for protecting the occupants of a rear seat, and which are generally fitted to the back of the front seat to project upwards thereon and across the front of the rear seat occupants, at about the level of their heads. The invention has been devised in order to provide a new and simple construction of such an appliance that will allow of it being folded into small space and stowed within the usual receptacle of a car seat or other convenient place, when it is not required for use. It has also been devised with the object of providing special means for mounting it in position and for operating it when it is in place, in combination with the opening and closing of the car tonneau doors.

The construction of weather shield devised and the manner of operating it are shown in the accompanying drawing and will be hereinafter fully described in relation to such drawings, in which—

Figure 1 is a sketch plan of the body of a motor car showing the shield fitted in its operative position.

Figure 2 is a cross sectional elevation thereof looking at the rear of the front seat and showing one of the rear doors opened.

The shield, as formed in accordance with this invention, is made up of two panels or frames A and B of equal size and of similar shape, each enclosing a sheet of mica, glass, or other approved transparent material generally used in the construction of weather shields. These two frames are hinge jointed together so as to be capable of extending end to end in a continuous plane or of folding in one upon the other, or of occupying positions at any angle between these positions, by swivelling their adjacent ends upon a vertical hinge pin C. The two portions A and B are made of such a length that their combined length will allow for them spreading across the full width of the car, and of such a height that when the shield is in position, they will extend sufficiently above the top of the front seat back as to afford the required protection to the occupants of the rear seat.

The shield thus formed is adapted in use to be positioned so that its two members extend rearwards in wide V fashion from the middle of the front seat to positions above the respective ends of the back seat in the manner shown by the full lines in Figure 1 so that when the shield has the usual dependent curtains attached to its lower edges, an effective weather shield is provided having outwardly deflecting surfaces for deflecting air currents from the faces and bodies of the occupants while their vision is rendered clear by the transparency of the frame filling.

The means for holding the shield in this position comprise means whereby the hinge ends of the shield are fitted to the centre of the front seat back so that the two members may swing on their pivot pin C to assume any of the positions described. They also comprise means for use with cars having the rear doors opening forwardly on their hinges, whereby the respective outer ends of the two members may be attached to the corresponding doors so that they will swing forwardly out of the way when the doors open, and will move back into V form when the doors close again.

The means devised for effecting this object consist of the central support in a bracket sleeve bearing E that is fixed to extend vertically on the back of the front seat F and into which the lower end of a downward extension C' of the hinge pin C fits so as to keep the hinge pin rigidly in the vertical position required. The outer end of each member of the shield is then stayed or supported by a cranked upright bar G the upper end of which is fitted into a bearing H fixed to the bottom of the frame and the lower end of which fits into a bracket J that is secured to the inside of the door K. The crank rod swivels in the bearings into which its ends fit, so that it acts as a stay to hold the shield frame rigid and will permit of the door opening and closing freely, the outer end of the frame swinging forwardly as the door opens as shown in the case of the left hand door by the dotted lines in Figure 1 and by the full lines in Figure 2, and rearwardly again as the door is closed.

The whole shield may be quickly removed by merely lifting it out of its bearings on the car, the stays G or M removed and the shield proper folded together on its hinge joint for stowing away in the desired receptacle. When required for use it may just as readily be assembled in working position.

I claim:—

In combination with a motor car having front and rear seats and swinging side doors, a weather shield comprising two framed panel members jointed end to end upon a straight hinge pin, a vertically disposed sleeve fixed to the front seat of the car, and adapted to receive a straight downward extension of the said hinge pin, a bearing provided near the free end of each of the said panel members, a bracket on the inside of each of the said swinging side doors, and a crank-shaped upright bar fitting with its ends into the said bearing and bracket, and pivotally connecting the free end of each panel member with the corresponding side door, so as to allow the said doors to be freely moved into open or closed position.

In testimony whereof, I affix my signature.

HENRY JAMES RANGER.